Figure 1:
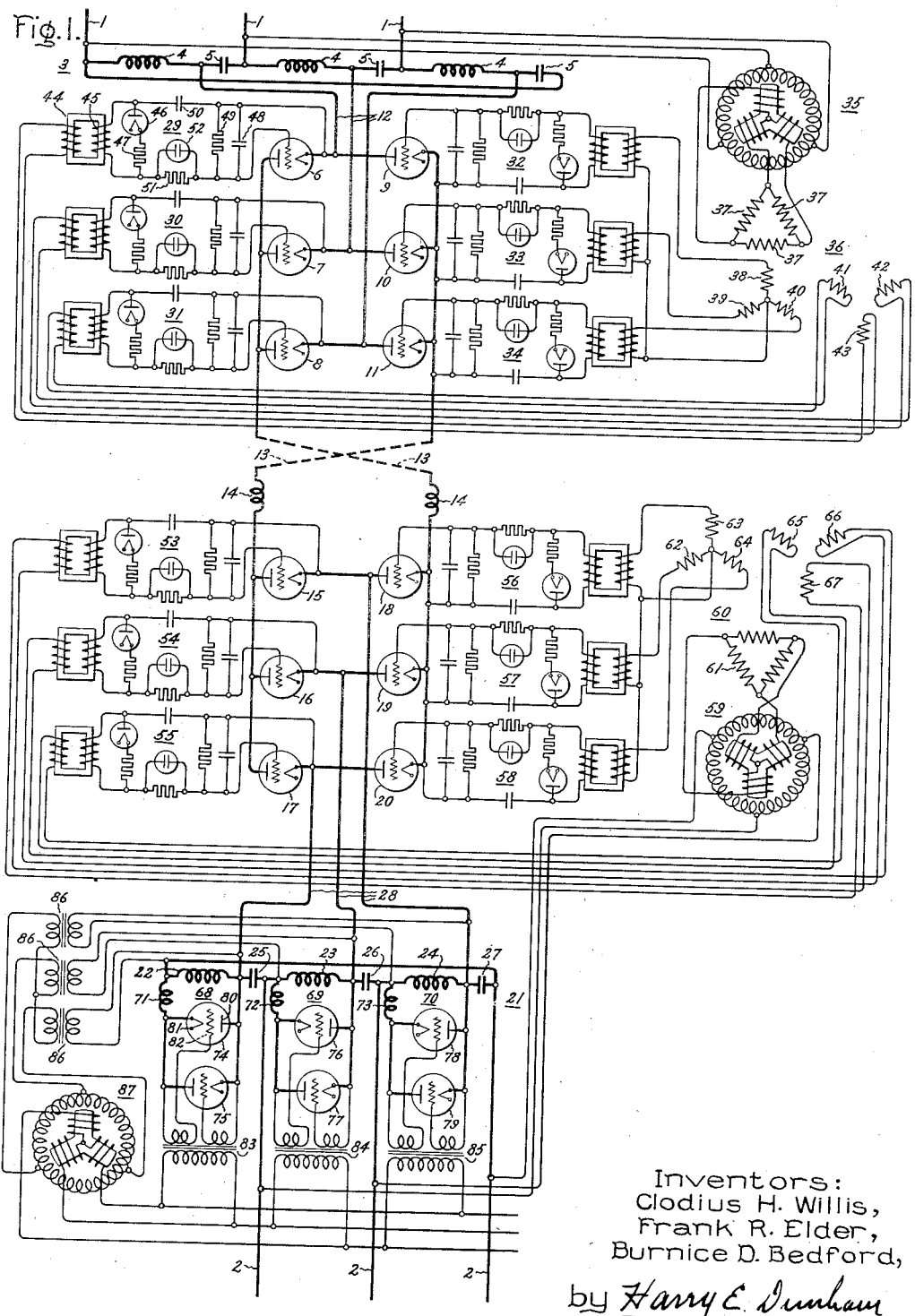

Inventors:
Clodius H. Willis,
Frank R. Elder,
Burnice D. Bedford,
by Harry E. Dunham
Their Attorney.

Nov. 2, 1937.  C. H. WILLIS ET AL  2,098,079
ELECTRIC POWER TRANSMISSION SYSTEM
Original Filed March 24, 1936   3 Sheets-Sheet 2
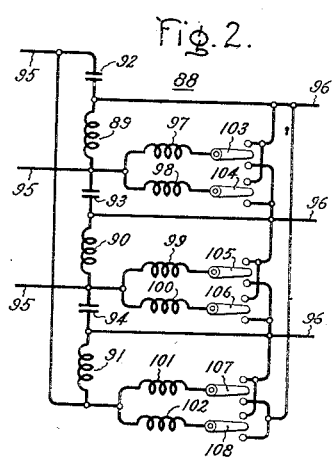
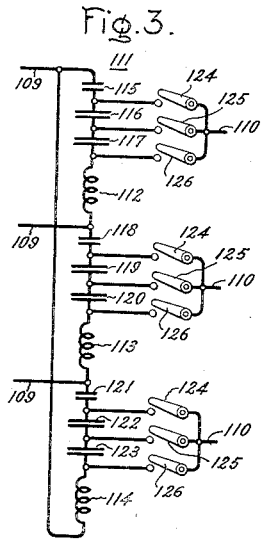
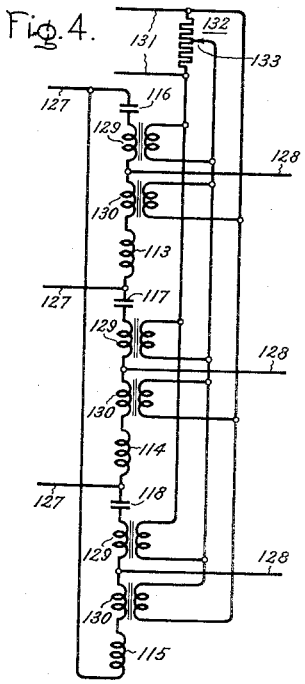
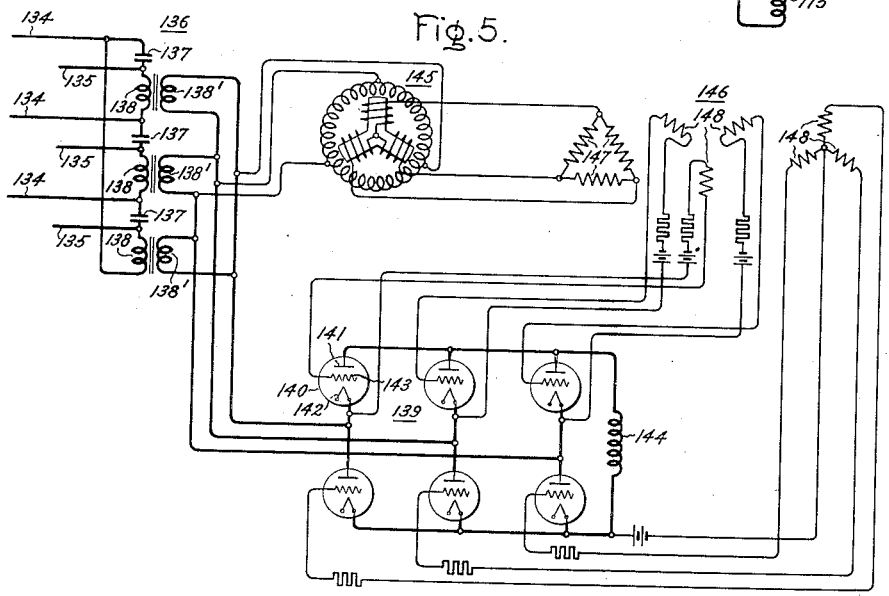
Inventors:
Clodius H. Willis,
Frank R. Elder,
Burnice D. Bedford,
by Harry E. Dunham
Their Attorney.

Patented Nov. 2, 1937

2,098,079

UNITED STATES PATENT OFFICE 2,098,079

ELECTRIC POWER TRANSMISSION SYSTEM

Clodius H. Willis, Princeton, N. J., Frank R. Elder and Burnice D. Bedford, Schenectady, N. Y., assignors to General Electric Company, a corporation of New York Application March 24, 1936, Serial No. 70,575
Renewed June 23, 1937

34 Claims. (Cl. 171—97)

Our invention relates to electric power transmission and distribution systems and more particularly to the transmission and distribution of power with constant direct current.

While our invention is generally applicable for use in connection with electric valve converting apparatus, it is particularly applicable for use in high voltage direct current power transmission systems of the type described and claimed in U. S. Letters Patent No. 1,990,758, granted February 12, 1935, on an application of Charles W. Stone and assigned to the assignee of the present application. Briefly described, the system as disclosed in the Stone patent comprises a source of energy of constant voltage alternating current which is transformed to alternating current of constant value and then rectified by an alternating current rectifier for transmission at high voltage direct current. The constant direct current is transmitted over a transmission circuit to a receiving circuit, which includes an electric valve inverter for changing the transmitted energy to alternating current of constant value which is transformed to alternating current of constant voltage for distribution purposes or for connection with another constant voltage alternating current system. The electric valve converting circuits employ networks of the monocyclic type for transforming alternating current from constant voltage to constant current, or vice versa. These networks comprise reactances of opposite sign such as inductive reactances and capacitive reactances.

Where transmission systems of the type disclosed and claimed in the above-mentioned Stone patent are employed, there has been evidenced a decided need for apparatus to control the quantity and direction of energy transfer when the system is connected to alternating current circuits of constant voltage. Of course, it is possible to control the quantity and direction of energy transfer through a system of this type by controlling the terminal voltage. However, it is frequently desirable to operate such a system where it is interconnecting two constant voltage alternating current systems. In view of the fact that in such arrangements it is impossible to provide the desired flexibility in control by varying the voltage of the connected constant potential systems, it has become desirable to provide other means for controlling the energy transmitted by the system.

It is an object of our invention to provide new and improved means for controlling the power flow in an electric circuit.

It is another object of our invention to provide an improved direct current system for transmitting electric power at constant current and which will be simple, economical and reliable in operation.

It is a further object of our invention to provide an improved system of electrical transmission and load control means therefor whereby the quantity and direction of energy flow through the system may be controlled.

It is a still further object of our invention to provide an improved arrangement for controlling the power transmitted by a direct current system of the constant current type.

In accordance with the illustrated embodiments of our invention, we provide means for controlling the energy transmitted by a high voltage direct current transmission system of the type described in the above-mentioned Stone patent. As is well known, systems of this type may employ networks of the monocyclic type at the sending and receiving ends of the transmission system for transforming constant voltage alternating current to alternating current of constant value and for transforming alternating current of constant value to constant voltage alternating current, respectively. In order to control the quantity and direction of energy transfer through the system, we provide means for controlling the resultant or effective values of the impedances of the branches of the monocyclic networks. In accordance with one embodiment of our invention, the net or resultant impedance of each of the inductive or the capacitive reactances in the monocyclic networks is controlled by means of an auxiliary circuit preferably connected in parallel with the main inductive reactances and including a control inductive reactance and an electronic discharge means. By controlling the conductivity of the associated electronic discharge means, we control the current which flows through the auxiliary circuit and hence control the net or resultant impedance of that branch of the monocyclic network.

In accordance with another illustrated embodiment of our invention, we provide means for controlling the impedance of the branches of the monocyclic network without materially disturbing the balanced condition of the network. This is accomplished by means of a plurality of capacitive or inductive reactances and switching means for selectively connecting said reactances in the monocyclic network to obtain the desired change in the impedance of the network branches without disturbing the balanced resonance condition and without disturbing the symmetry of the monocylic network. In accordance with another embodiment of our invention, we provide control means for a monocyclic network including saturable reactors to control the net or resultant impedance of the capacitive and inductive branches of the monocyclic network.

For a better understanding of our invention, reference may be had to the following description taken in connection with the accompanying drawings, and its scope will be pointed out in the appended claims.

Figure 6:
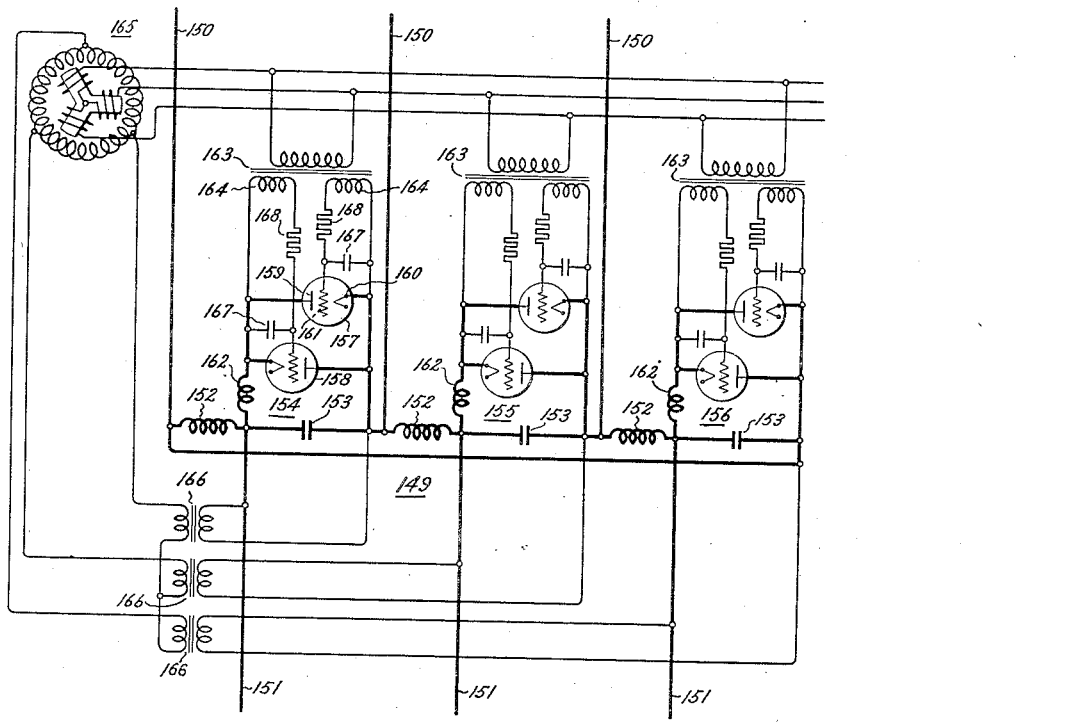

Fig. 1 of the accompanying drawings diagrammatically represents an electric transmission system of the type disclosed and claimed in the abovementioned Stone patent and which employs a load control means associated with one of the monocyclic networks to control the energy transfer between constant potential systems; Figs. 2 and 3 represent other load control means associated with monocyclic networks using auxiliary impedances and switching means for controlling the resultant impedances of the monocyclic networks; Fig. 4 shows a load control arrangement for a monocyclic network employing saturable reactors, while Figs. 5 and 6 show modifications of electric valve means and associated auxiliary control impedances for controlling the resultant impedances of the branches of an associated monocyclic network.

Referring now to Fig. 1 of the accompanying drawings, our invention is diagrammatically illustrated as applied to an electric valve transmission system of the constant direct current type for transmitting electrical energy between a constant voltage alternating current circuit 1 and a constant voltage alternating current circuit 2. A network 3 of the monocyclic type, employing inductive reactances 4 and capacitive reactances 5, is provided to transform the constant voltage alternating current into alternating current of constant value. Any suitable electric valve means such as the electric valve aggregate including electric valves 6–11, inclusive, preferably of the type employing an ionizable medium such as a gas or vapor, is used to convert the alternating current of constant value to direct current of constant value and is connected to the network 3 through conductors 12. This direct current of constant value is transmitted through a transmission line 13 and smoothing reactors 14 to the receiving end of the transmission system where the direct current of constant value is inverted to alternating current of constant value by means of an electric valve aggregate including electric valves 15–20, inclusive, preferably of the type employing ionizable mediums such as gases or vapors. To transform the alternating current of constant value to constant voltage alternating current, we employ a network 21 of the monocyclic type including inductive reactances 22, 23 and 24 and capacitive reactances 25, 26 and 27. The monocyclic network 21 is connected to electric valves 15–20 through conductors 28.

In order to control the conductivity of electric valves 6–11 at the sending end of the transmission system, we provide control or excitation circuits 29–34, respectively, which are energized in a predetermined sequence to effect rectification of the alternating current of constant value supplied by the monocyclic network 3. The excitation circuits 29–34 may be energized from the alternating current circuit 1 through any conventional phase shifting arrangement, such as the rotary phase shifting device 35, and a transformer 36 having primary windings 37 and secondary windings 38–43, inclusive. Each of the excitation circuits 29–34 is provided with a transformer 44, preferably of the type designed to provide a voltage of peaked wave form and having a secondary winding 45. A unidirectional conducting device 46 and a resistance 47 are connected in series relation and across the terminals of the secondary winding 45 of transformer 44 to short circuit the secondary winding during negative half cycles of potential appearing across the secondary winding. To neutralize the mutual capacitance existing between the control member and the anode of electric valve 6, we connect a capacitance 48 across the control member and the cathode of this valve, and to suppress high voltage transients we employ a resistance 49 which is also connected across the cathode and the control member of electric valve 6. The resistance 49 may be of the type having a non-linear volt-ampere characteristic. To provide a self-rectifying bias, we employ a capacitance 50 connected in series relation with one terminal of the secondary winding 45 of transformer 44 and the cathode of electric valve 6. A current limiting resistance 51 is connected in series with the other terminal of the secondary winding 45 of transformer 44 and the control member of electric valve 6. A glow discharge valve 52 is connected across the resistance 51 to indicate when the electric valve 6 is operating in a predetermined manner and also to indicate when the electric valve departs from normal operation. This feature of indicating the operation of an electric valve is described and broadly claimed in an application for U. S. Letters Patent Serial No. 61,508 of C. H. Willis et al., filed January 30, 1936, and assigned to the assignee of the present application. It should be understood that where it is desired to provide full wave rectification of the alternating current of constant value supplied by the monocyclic network 3 and where controlled rectification or inversion is not required, it will not be necessary to employ electric valves having control members and electric valves employing only two electrodes may be used. However, where it is desired to provide a system which may function to transmit energy in either direction, it becomes necessary to employ electric valves having control members so that the electric valve aggregate in question may operate either as a converter or as an inverter.

Similarly, to control the conductivity of electric valves 15–20, inclusive, we employ excitation circuits 53–58, respectively, which are energized from the constant potential alternating current circuit 2 through any conventional phase shifting arrangement, such as the rotary phase shifting device 59, and a transformer 60 having a primary winding 61 and secondary windings 62–67, inclusive. The excitation circuits 53–58, inclusive, are similar in construction and arrangement to excitation circuits 29–34 associated with electric valves 6–11.

To provide a means for controlling the transmission system so that the quantity and direction of energy transfer may be controlled, we employ a plurality of auxiliary circuits 68, 69 and 70 including control impedances such as inductive reactances 71, 72 and 73 and electronic discharge devices 74, 75; 76, 77 and 78, 79, respectively, preferably of the gaseous type. Each of the electronic discharge devices 74–79 is provided with an anode 80, a cathode 81 and a control member 82. For example, by means of the electronic discharge devices 74 and 75 and the serially-connected control inductive reactance 71, we control the net or effective impedance of the circuit including inductance 22 and the inductance 71. The conductivity of electronic discharge devices 74-79, inclusive, is controlled by means of transformers 83, 84 and 85 which are energized in accordance with an electrical condition of the monocyclic network 21, such as the voltage of inductive reactances 22, 23 and 24, through transformers 86 and any conventional phase shifting device such as the rotary phase shifter 87.

The general principles of operation of the embodiment of our invention diagrammatically shown in Fig. 1 of the accompanying drawings may be best explained by considering the operation of the transmission system when energy is being transmitted from the constant potential alternating current circuit 1 to the constant potential alternating current circuit 2. The constant potential alternating current supplied to the circuit 1 is transformed to alternating current of constant value by the monocyclic network 3, rectified by the converter including electric valves 6-11, and delivered to the circuit 13 as high voltage direct current of constant value for transmission. Direct current of constant value is transmitted to the receiving end of the transmission system where electric valves 15-20 invert the direct current to alternating current of constant value. The alternating current of constant value is transformed to constant voltage alternating current by means of the monocyclic network 21 and supplied to the constant potential alternating current circuit 2. The electric valve rectifier including electric valves 6-11 will operate in a manner well understood by those skilled in the art to effect rectification of the alternating current of constant value supplied by conductors 12. Where it is deemed unnecessary or inexpedient to transmit energy in both directions, the controlled rectifier including electric valves 6-11 may be replaced by electric valves employing only two electrodes to provide full wave rectification of the alternating current of constant value. However, where it is desirable to transmit energy in either direction through the transmission system, it will be necessary to employ electric valves employing a control member such as electric valves 6-11. Pairs of oppositely disposed electric valves of the rectifier comprising electric valves 6-11 will successively supply unidirectional current of constant value to the transmission circuit 13.

At the receiving end of the transmission system, the electric valve inverter including electric valves 15-20 will invert the direct current of constant value into alternating current of constant value. The excitation circuits 53-58 associated with electric valves 15-20, respectively, will control the conductivity of the electric valves in a predetermined sequence to supply three phase alternating current of constant value to the conductors 28. Electric valves 15-20 will be rendered conductive in the following sequence: 15, 20, 16, 18, 17, 19, by excitation circuits 53, 58, 54, 56, 55, 57, respectively. In accordance therewith the following pairs of electric valves will be rendered conductive during successive sixty degree electrical intervals: 15 and 20, 20 and 16, 16 and 18, 18 and 17, 17 and 19, and 19 and 15.

The excitation circuits 53-58 are energized in a predetermined sequence by means of secondary windings 62-67 of transformer 60. Positive half cycles of potential appearing across the secondary windings 45 of transformers 44 are impressed on the control members of electric valves 15-20 to render these valves conductive. During normal operation the glow discharge valves 52 will provide a predetermined indication and if for any reason the respective control of excitation circuits or associated main electric valves operate in an abnormal manner, these glow discharge valves will furnish a predetermined different indication thereby affording a means for detecting irregular operation.

It is understood that the magnitude and direction of energy transfer between the alternating current circuit 1 and the alternating current circuit 2 will be determined by the voltages of these circuits and by the constants of the monocyclic networks 3 and 21. If it be assumed that the circuit is arranged so that energy is being transmitted from the constant potential alternating current circuit 1 to the constant potential alternating current circuit 2, the quantity and direction of energy may be controlled by controlling the impedance of the elements or branches of monocyclic network 3 or monocyclic network 21. For the purpose of explaining our invention, we have shown means associated with the monocyclic network 21 for controlling the impedance of the network to effect control of the quantity and direction of energy transfer. The auxiliary control circuits, 68, 69, and 70, comprising control inductive reactances 71, 72 and 73 and electronic discharge devices 74 and 75, 76 and 77, and 78 and 79, respectively, control the impedance of the network 21 and thereby control the quantity and direction of energy transfer. Where energy is being transferred from circuit 1 to circuit 2, the quantity of energy may be increased by increasing the effective impedance of the monocyclic network 21. By way of example, the current being conducted by electronic discharge devices 74 and 75 associated with control inductive reactance 71 and inductive reactance 22 may be decreased by retarding the phase of the potentials impressed upon the control members 82 of electric valves 74 and 75, by means of the phase shifter 87, to effect a decrease in the current conducted through these valves and an increase in the net impedance of the inductive branch of the network including inductive reactance 71. It should be understood that by this means the net or resultant impedance of the inductive branch circuit including reactances 71 and 22 may be increased to effect an increase in the transfer of energy from circuit 1 to circuit 2. On the other hand, if energy is being transmitted from the alternating current circuit 2 to the alternating current circuit 1 in order to increase the energy transfer, it will be necessary to decrease the effective impedance of the inductive branches or elements of the monocyclic network 21. This decrease in effective impedance may be accomplished by advancing the phase of the potentials impressed upon the respective control members 82 of electronic discharge devices 74-79, by means of the phase shifter 87, to increase the current conducted through the branches including auxiliary or control inductive reactances 71, 72 and 73.

The above described load control means also makes it possible to control not only the quantity of energy transfer between two constant potential alternating current systems, but also provides a satisfactory and reliable arrangement for controlling the direction of energy transfer between such systems.

Fig. 2 of the accompanying drawings diagrammatically represents another embodiment of our invention for controlling the impedance of a monocyclic network to effect control of the energy transfer between a constant voltage alternating current circuit and a constant current alternating current circuit. The monocyclic network 88 including inductive reactances 89, 90 and 91 and capacitive reactances 92, 93 and 94 is energized from a constant potential alternating current circuit 95 and supplies alternating current of constant value to the circuit 96. To provide means for controlling the impedances of the branches of the monocyclic network 88 in corresponding increments and hence to effect control of the energy transfer between circuits 95 and 96 without disturbing the electrical symmetry of the network, we employ auxiliary or control inductive reactances 97-102, inclusive, and means such as switches 103-108 for connecting the auxiliary inductive reactances in the monocyclic network. The switches 103-108 may be maintained in any of the three positions; that is, the switches may be maintained in the open position, moved to the upper position, or moved to the lower position.

The operation of the load control means diagrammatically illustrated in Fig. 2 may be best explained by considering the operation of the monocyclic network 88 when the network is in a substantially balanced condition, that is, when the inductive reactance of the reactances 89, 90 or 91 is substantially equal to the capacitive reactance of reactances 92, 93 and 94. For the purposes of explanation, let it be assumed that it is unobjectionable to operate the monocyclic network with a slight impedance unbalance, such as the condition in which the inductive reactances have a value of 107.5 per cent and the capacitances 92-94 have capacitive reactances of 100 per cent. Assume that the auxiliary or control inductive reactances 97-102 have a substantially greater inductive reactance than the main inductive reactances 89-91, such as approximately twenty times greater. When the switches 103-108 are moved to the upper position the control reactances will be connected in parallel with the associated main reactances to effect a decrease in the net impedance at the inductive branches of the network. By way of example, reactances 97 and 98 will be connected in parallel with reactance 89, effecting thereby a decrease in the net inductive reactance of that branch of the monocyclic network. With the switches 103-108 in the upper positions, the main or resultant impedance of each of the inductive branches of the monocyclic network will be decreased to substantially 97.5 per cent. Due to this decrease in the effective impedance of the inductive branches of the network, the current transfer from the constant potential alternating current circuit 95 to the constant current alternating current circuit 96 will be increased. On the other hand, if the switches 103-108 are moved to the lower positions, the associated control inductive reactances will be connected in parallel with the respective capacitive reactances. For example, if the switches 103 and 104 are moved to the lower positions, control inductive reactances 97 and 98 will be connected in parallel with the capacitive reactance 93. The effect of this arrangement is to increase the net capacitive reactance of this branch of the network to approximately 110 per cent while the inductive reactance of reactance 89 is 107.5 per cent. With the switches in the lower position, it will be noted that the impedance of the network is increased and in accordance therewith the current transfer from the constant potential circuit 95 to the constant current circuit 96 will be decreased. When the switches 104, 106 and 108 are in the open circuit positions and when switches 103, 105 and 107 are in the upper positions, the capacitive reactance of each branch is 100 per cent and the inductive reactance of each branch is 102.5 per cent; therefore, the unbalance of the network is 2.5 per cent. When the switches 104, 106 and 108 are in the lower circuit positions and switches 103, 105 and 107 are in the upper circuit positions, the capacitive reactance of each branch is 105 per cent and the inductive reactance of each branch is 102.5 per cent, maintaining an unbalance of only 2.5 per cent. When switches 103, 105 and 107 are in the open positions and switches 104, 106 and 108 are in the lower circuit positions, the capacitive reactance of each branch is 105 per cent and the inductive reactance of each branch is 107.5 per cent, maintaining an unbalance of only 2.5 per cent. Lastly, when switches 103-108, inclusive, are in the lower circuit positions, the capacitive reactance of each branch is 110 per cent and the inductive reactance of each branch is 107.5 per cent, and the unbalance, of course, is only 2.5 per cent. It is to be noted that by virtue of the above operations or manipulations, the energy transfer between circuits 95 and 96 may be controlled and that the maximum unbalance under these conditions is only 2.5 per cent.

It should be understood that by virtue of the arrangement shown in Fig. 2, it is possible to effect considerable load control with a minimum impedance unbalance in the monocyclic network 88. The maximum unbalance at any time is 2.5 per cent and the available control of the monocyclic impedance is 10 per cent. Although the operation of the load control means shown in Fig. 2 is described in connection with energy transfer from the constant potential alternating current circuit 95 to the constant current alternating current circuit 96, it should be understood that the energy transfer may be controlled when the circuit 96 is supplying energy to the circuit 95.

Referring now to Fig. 3 of the accompanying drawings, there is shown a load control arrangement for controlling the energy transfer from a constant potential alternating current circuit 109 to a constant current alternating current circuit 110 through a monocyclic network 111 including inductive reactances 112, 113 and 114 and capacitances 115-123. In order to control the connection of the capacitances 115-123, we provide suitable means such as switches 124, 125 and 126.

For the purpose of explaining the operation of the embodiment of our invention shown in Fig. 3, let it be assumed that the inductive reactance of each of the reactances 112-114 is substantially 110 per cent and that the capacitive reactance of each of the capacitances 115, 118 and 121 is substantially 100 per cent. Furthermore, let it be assumed that the capacitive reactance of each of the capacitances 116 and 117, 119 and 120, 122 and 123 is 5 per cent. When the switches 126 are moved to the closed position, it will be apparent that the monocyclic network is balanced; that is, the inductive reactance of each of the inductive branches is 110 per cent and the total capacitive reactance of each of the branches is also 110 per cent. If it is desired to decrease the impedance of the monocyclic network 111 and thereby increase the energy transfer from the circuit 109 to the circuit 110, switches 125 may be closed and switches 126 placed in the open position. In this condition it will be seen that the resultant impedance of the inductive branch of the network including, for example, inductive reactance 112 will be reduced to 105 per cent and the total capacitive reactance of the capacitive branches will also be reduced to 105 per cent. If it is desired to effect a further increase in the current transfer from circuit 109 to circuit 110, switches 124 may be moved to the closed position and switches 125 and 126 placed in the open position. Under this latter condition, the net reactance of the inductive branches of the network will be 100 per cent and the reactance of the capacitive branches will also be 100 per cent. It will be apparent that under these conditions of load control the monocyclic network is maintained in a balanced condition; that is, the net inductive reactance of each branch is always equal to the resultant capacitive reactance.

Although in Figs. 2 and 3 of the accompanying drawings we have diagrammatically illustrated mechanical switching means for controlling the connection of the various reactances in the networks to control the effective or resultant impedance of the network branches, it should be understood that our invention in its broader aspects is intended to include other means such as electronic discharge devices for effecting this selective control of the monocyclic networks.

Referring now to Fig. 4 of the accompanying drawings, a further embodiment of our invention is diagrammatically illustrated as applied to a load control arrangement for controlling the energy transfer from a constant potential alternating current circuit 127 to a constant current alternating current circuit 128 through a monocyclic network including inductive reactances 113, 114 and 115, capacitances 116, 117 and 118 and saturable reactors 129 and 130. For example, the saturable reactor 129 is associated with the capacitance 116 and the saturable reactor 130 is associated with inductive reactance 113. The saturable reactors 129 and 130 are energized from any suitable source of direct current 131 through a voltage divider 132 having an adjustable contact 133. By means of the voltage divider 132 and adjustable contact 133, the energization of saturable reactors 129 and 130 may be controlled in a manner so that as the current supplied to one of these saturable reactors is increased, the current supplied to the other of these reactors is decreased proportionately. The monocyclic network is designed so that the network is maintained balanced under all conditions and permits control of the current transfer from circuit 127 to circuit 128.

Let it be assumed that the monocyclic network shown in Fig. 4 is maintained in a substantially balanced condition and that current is being transferred from the constant potential circuit 127 to the constant current circuit 128. Under this condition, let it further be assumed that the reactor 129 is saturated and that the reactor 130 is substantially unsaturated. If it is desired to increase the current transfer from circuit 127 to circuit 128, the impedance of the branches of the monocyclic network may be decreased by moving downward the adjustable contact 133 of voltage divider 132. By this action, the voltage and hence the current supplied to saturable reactor 129 is decreased, thereby desaturating this reactor and effecting a substantial increase in the inductance and the inductive reactance of this reactor. Conversely, since the voltage and hence the current supplied to the reactor 130 is increased, the reactor 130 will be substantially saturated resulting in a decrease in the inductive reactance of this reactor. By virtue of these changes in the inductive reactances of reactors 129 and 130, the net capacitive reactance of the capacitive branch of the monocyclic network is decreased and the net inductive reactance of the inductive branch of the network is also decreased. In other words, the currents through the capacitive and the inductive branches of the monocyclic network will be increased, effecting thereby an increase in the current transfer from circuit 127 to circuit 128. On the other hand, the current transfer between the circuits 127 and 128 may be decreased by moving upward the adjustable contact 133 of voltage divider 132.

Fig. 5 of the accompanying drawings diagrammatically represents another embodiment of our invention as applied to a load control arrangement for controlling the current transfer between a constant potential alternating current circuit 134 and a constant current alternating current circuit 135 through a monocyclic network 136 including capacitive reactances 137 and inductive reactances 138 having control windings 138'. To control the effective or resultant value of the inductive reactances 138, we employ an electric valve aggregate 139 including electric valves 140 each having an anode 141, a cathode 142 and a control member 143. A suitable inductance 144 is connected in the electric valve aggregate 139 and serves as an inductive load for the electric valves 140. The electric valve aggregate 139 and the inductance 144 are provided to control the net or resultant reactance of the inductive reactances 138 in the monocyclic network 136. To control the conductivity of electric valves 140 in accordance with an electrical condition of the monocyclic network 136, such as the voltage appearing across the control windings 138' of the inductive reactances 138, we employ a plurality of excitation circuits each associated with a different one of the electric valves 140 and energized through any conventional phase shifting device 145 and transformer 146 having primary windings 147 and secondary windings 148.

The operation of the load control arrangement diagrammatically shown in Fig. 5 of the accompanying drawings may be best explained by considering the arrangement when energy is being transferred from the constant potential circuit 134 to the constant current circuit 135. If it is desired to increase the quantity of current transfer to the constant current circuit 135, the impedance of the monocyclic network 136 may be decreased by decreasing the inductive reactance of the reactances 138. This may be accomplished by advancing the phase of the potentials impressed on the respective control members 143 of electric valves 140 by means of the phase shifter 145, thereby increasing the average current conducted by each of these valves and effecting an increase in the inductive load current through inductance 144. In this manner the value of the inductive reactance of reactances 138 is controlled to effect control of the impedances of the branches of the monocyclic network 136. Conversely, if it is desired to decrease the quantity of current transfer from circuit 134 to circuit 135, the phase of the potentials impressed on the respective control members 145 of electric valves 140 may be retarded by means of the phase shifter 146, decreasing the current conducted by the electric valve aggregate and thereby effecting increase in the impedance of reactances 138.

Referring to Fig. 6 of the accompanying drawings, a load control system employing electronic discharge devices and auxiliary control impedances is shown as applied to a monocyclic network 149 for interconnecting a constant potential alternating current circuit 150 and a constant current alternating current circuit 151. The monocyclic network 149 is provided with inductive reactances 152 and capacitive reactances 153. Auxiliary control circuits 154, 155 and 156 are associated with each of the capacitive reactances 153 to control the net or resultant impedance of that branch of the monocyclic network and to thereby effect control of the current supplied to the constant current alternating current circuit 151. Each of the auxiliary control circuits 154–156 is provided with a pair of oppositely disposed electronic discharge devices 157 and 158. Each of the electronic discharge devices is provided with an anode 159, a cathode 160 and a control member 161. Connected in series with the electronic discharge devices 157 and 158 is an auxiliary or control impedance such as an inductive reactance 162.

To control the conductivity of electronic discharge devices 157 and 158 in accordance with an electrical condition of the monocyclic network 149, such as the voltage appearing across the capacitive reactances 153, we employ transformers 163 having secondary windings 164 which are energized through any conventional phase shifting device such as the rotary phase shifter 165 and transformers 166. Capacitances 167 are connected across the respective control members 161 and cathodes 160 of electronic discharge devices 157 and 158 to suppress transients, and current limiting resistances 168 are connected in series with the control members 161 and the associated secondary windings 164 of transformers 163.

The operation of the load control means diagrammatically illustrated in Fig. 6 may be explained by considering the operation of the arrangement when energy is being transferred from the constant potential alternating current circuit 150 to the constant current alternating current circuit 151. If it is desired to increase the value of current supplied to the constant current alternating current circuit 151, the phase of the potentials impressed on the control members 161 of electronic discharge devices 157 and 158 may be retarded by means of the rotary phase shifter 165 to effect a decrease in the current conducted through the auxiliary or control impedances 162, thereby effecting a decrease in the net or resultant impedance of the branches of the monocyclic network including the capacitive reactances 153 and the serially-connected control impedances 162 and the electronic discharge devices 157 and 158. On the other hand, if it is desired to decrease the value of the current supplied to the constant current alternating current circuit 151, the phase of the potentials impressed on the control members 161 of electronic discharge devices 157 and 158 may be advanced relative to the potentials impressed on the respective anodes of these devices by the rotary phase shifter 165. When the phase of these potentials is so advanced, the current conducted through the control impedances 162 by the electronic discharge devices 157 and 158 is increased effecting thereby an increase in the impedance of the associated branch of the monocyclic network.

Although in the above described arrangements shown in Figs. 1 and 6 the auxiliary or control impedances have been described as inductive reactances, it should be understood that these control impedances may be capacitive reactances. Of course, if capacitive reactances are employed the phase control of the potentials impressed on the control members of the associated electronic discharge means must be correspondingly modified to accomplish the desired control. While we have diagrammatically shown in Figs. 2–6, inclusive, various modifications of load control means applied to monocyclic networks for effecting the desired transformation between constant potential alternating current circuits and constant current alternating current circuits, it is to be noted that the arrangements shown in these figures may be applied to electric valve translating systems of the type diagrammatically shown in Fig. 1 of the drawings.

While we have shown and described our invention as applied to a particular system of connections and as embodying various devices diagrammatically shown, it will be obvious to those skilled in the art that changes and modifications may be made without departing from our invention, and we, therefore, aim in the appended claims to cover all such changes and modifications as fall within the true spirit and scope of our invention.

What we claim as new and desire to secure by Letters Patent of the United States, is:—

1. In combination, an alternating current constant potential circuit, a load circuit, electronic converting means interposed between said circuits, constant current-constant potential transforming means interposed between said alternating current circuit and said electronic means and comprising a network of reactances of opposite sign, and means for controlling the impedance of said network to control the energy transfer between said circuits.

2. In combination, an alternating current constant potential circuit, a load circuit, electronic converting means interposed between said circuits, a network having inductive and capacitive branches for transforming said constant voltage alternating current to alternating current of constant value and being interposed between said alternating current circuit and said electronic means, and means for controlling the impedance of said branches of said network to control the energy transfer between said circuits and for maintaining the resultant branch impedances substantially equal.

3. In combination, a source of constant voltage alternating current, a load circuit, translating apparatus interconnecting said circuits comprising a network of inductive reactances and capacitive reactances for transforming said constant voltage alternating current to alternating current of constant value, and means comprising auxiliary impedances and electronic discharge means for controlling the resultant value of said reactances in said network to effect control of the energy transfer between said circuits.

4. In combination, a source of constant voltage alternating current, a load circuit, translating apparatus interconnecting said circuits including a network having an inductive reactance and a capacitive reactance for transforming said constant voltage alternating current to alternating current of constant value, and means connected in parallel with one of said reactances for controlling the energy transfer between said circuits comprising control impedances and electronic discharge means for controlling the effective impedance of said network.

5. In combination, a source of constant voltage alternating current, a load circuit, translating apparatus interconnecting said circuits comprising a network having inductive and capacitive branches for transforming said constant voltage alternating current to alternating current of constant value, and means for controlling the impedance of said inductive branches of said network to control the energy transfer between said circuits.

6. In combination, a source of constant voltage alternating current, a load circuit, translating apparatus interconnecting said circuits comprising a network having inductive and capacitive branches for transforming said constant voltage alternating current to alternating current of constant value, and means for controlling the impedance of said capacitive branches of said network to control the energy transfer between said circuits.

7. In combination, a source of constant voltage alternating current, an alternating current circuit, translating apparatus interconnecting said circuits including a network having an inductive reactance and a capacitive reactance for transforming said constant voltage alternating current to alternating current of constant value, and an auxiliary circuit connected in parallel with said inductive reactance for controlling the quantity and direction of energy transfer between said circuits comprising a serially-connected inductive reactance and electronic discharge means.

8. In combination, a source of constant voltage alternating current, an alternating current circuit, translating apparatus interconnecting said circuits including a network having an inductive reactance and a capacitive reactance for transforming said constant voltage alternating current to alternating current of constant value, and an auxiliary circuit connected in parallel with said capacitive reactance for controlling the quantity and direction of energy transfer between said circuits comprising a serially-connected inductive reactance and electronic discharge means.

9. In combination, a source of constant voltage alternating current, a load circuit, translating apparatus interconnecting said circuits comprising a network of inductive reactances and capacitive reactances for transforming said constant voltage alternating current to alternating current of constant value, and means comprising a plurality of electronic discharge means and reactances each associated with a different one of said inductive reactances for controlling the resultant value of said reactances in said network to effect control of the energy transfer between said circuits.

10. In combination, a source of constant voltage alternating current, a load circuit, translating apparatus interconnecting said circuits including a network having an inductive reactance and a capacitive reactance for transforming said constant voltage alternating current to alternating current of constant value, means connected in parallel with one of said reactances for controlling the energy transfer between said circuits comprising control impedances and electronic discharge means for controlling the effective impedance of said network, and means for controlling said electronic discharge means in accordance with an electrical condition of said network.

11. In combination, a source of constant voltage alternating current, an alternating current circuit, translating apparatus interconnecting said circuits including a network having an inductive reactance and a capacitive reactance for transforming said constant voltage alternating current to alternating current of constant value, an auxiliary circuit connected in parallel with said inductive reactance for controlling the quantity and direction of energy transfer between said first-mentioned circuits comprising a serially-connected inductive reactance and electronic discharge means, and means for controlling the conductivity of said electronic discharge means in accordance with an electrical condition of said network to control the current in said auxiliary circuit.

12. In combination, a source of constant voltage alternating current, an alternating current circuit, translating apparatus interconnecting said circuits including a network having an inductive reactance and a capacitive reactance for transforming said constant voltage alternating current to alternating current of constant value, an auxiliary circuit connected in parallel with said capacitive reactance for controlling the quantity and direction of energy transfer between said first-mentioned circuits comprising a serially-connected inductive reactance and electronic discharge means, and means for controlling the conductivity of said electronic discharge means in accordance with an electrical condition of said network to control the current in said auxiliary circuit.

13. In combination, a source of constant voltage alternating current, an alternating current circuit, translating apparatus interconnecting said circuits including a network having an inductive branch circuit and a capacitive branch circuit for transforming said constant voltage alternating current to alternating current of constant value, and means for controlling the impedance of said network to effect control of the energy transfer between said circuits and for maintaining the resultant impedances of said branch circuits substantially equal by controlling the value of said inductive reactance and said capacitive reactance.

14. In combination, a source of constant voltage alternating current, a load circuit, translating apparatus interconnecting said circuits comprising a network of reactances of opposite sign for transforming said constant voltage alternating current to alternating current of constant value, means comprising reactances of a predetermined sign arranged to be selectively connected in said network, and means for connecting said reactances of predetermined sign in said network to effect control of the energy transfer between said circuits.

15. In combination, a source of constant voltage alternating current, a load circuit, translating apparatus interconnecting said circuits including a network having branch circuits of inductive reactances and branch circuits of capacitive reactances and being of substantially equal values for transforming said constant voltage alternating current to alternating current of constant value, means comprising a plurality of reactances of predetermined sign arranged to be connected in said network to control the impedance of said network, and means for selectively connecting said plurality of reactances of predetermined sign in said network to maintain the resultant impedances of said branch circuits substantially equal and for controlling the energy transfer between said circuits.

16. In combination, a source of constant voltage alternating current, an alternating current circuit, translating apparatus interconnecting said circuits including a network having an inductive reactance and a capacitive reactance for transforming said constant voltage alternating current to alternating current of constant value, and means for controlling the impedance of said network to effect control of the quantity and direction of energy transfer between said circuits comprising switching apparatus for controlling said inductive reactance and said capacitive reactance.

17. In combination, a source of constant voltage alternating current, a load circuit, translating apparatus interconnecting said circuits comprising a network of reactances of opposite sign for transforming said constant voltage alternating current to alternating current of constant value, and means for controlling the impedance of said network to effect control of the energy transfer between said circuits comprising switching apparatus for controlling the impedances of said reactances.

18. In combination, a source of constant voltage alternating current, a load circuit, translating apparatus interconnecting said circuits including a network having an inductive reactance and a capacitive reactance for transforming said constant voltage alternating current to alternating current of constant value, control reactances for controlling the net effect of said inductive reactance and said capacitive reactance, and means comprising switching apparatus for connecting said control reactances in said network to effect control of the energy transfer between said circuits.

19. In combination, a source of constant voltage alternating current, a load circuit, translating apparatus interconnecting said circuits including an inductive reactance and a capacitive reactance, control inductive reactances for controlling the net impedance of said inductive reactance and said capacitive reactance, and means comprising switching apparatus for connecting said control inductive reactances in parallel with said first-mentioned inductive reactance or in parallel with said capacitive reactance.

20. In combination, a source of constant voltage alternating current, a load circuit, translating apparatus interconnecting said circuits comprising a network of reactances of opposite sign for transforming said constant voltage alternating current to alternating current of constant value, said reactances of opposite sign having substantially equal impedances, means associated with said inductive reactance and said capacitive reactance for controlling the energy transfer between said circuits comprising variable inductances, and means for controlling the value of said inductances to control the resultant impedance of said network.

21. In combination, a source of constant voltage alternating current, a load circuit, translating apparatus interconnecting said circuits comprising a network having an inductive reactance branch and a capacitive reactance branch for transforming said constant voltage alternating current to alternating current of constant value, and means for controlling the energy transfer between said circuits comprising variable inductances associated with said inductive reactance and said capacitive reactance to control concomitantly the resultant reactance of said inductive reactance branch and said capacitive reactance branch.

22. In combination, a source of constant voltage alternating current, a load circuit, translating apparatus interconnecting said circuits including a network having an inductive reactance and a capacitive reactance, a variable inductance associated with said inductive reactance, a variable inductance associated with said capacitive reactance, and means for controlling the impedance of said network by controlling the values of said inductances to effect control of the quantity and direction of energy transfer between said circuits.

23. In combination, a source of constant voltage alternating current, a load circuit, translating apparatus interconnecting said circuits comprising a network of reactances of opposite sign for transforming said constant voltage alternating current to alternating current of constant value, saturable reactances associated with said reactances of opposite sign, and means for controlling the impedance of said network to effect control of the energy transfer between said circuits comprising a source of direct current and a voltage divider for controlling the impedance of said saturable reactances.

24. In combination, a source of constant voltage alternating current, a load circuit, translating apparatus interconnecting said circuits comprising a network including an inductive reactance and a capacitive reactance for transforming said constant voltage alternating current to alternating current of constant value, a variable inductance associated with said inductive reactance, a variable inductance associated with said capacitive reactance, and means comprising a source of direct current and a voltage divider for controlling the values of said inductances to effect control of the energy transfer between said circuits and for maintaining said network in a balanced condition.

25. In combination, a source of constant voltage alternating current, means including a network of reactances of opposite sign for transforming said constant voltage alternating current to alternating current of constant value, means including an electronic discharge device for converting the alternating current of constant value to direct current of constant value, means including an electronic discharge device for inverting said direct current of constant value to alternating current of constant value, means including a network of reactances of opposite sign for transforming said alternating current of constant value to alternating current of constant voltage, and means for controlling the impedance of one of said networks to control the energy supplied by said source of constant voltage alternating current.

26. In combination, a constant voltage alternating current supply circuit, a constant voltage alternating current load circuit, means associated with said supply circuit for transforming said constant voltage alternating current to direct current of constant value comprising a network of reactances of opposite sign and electronic discharge means, means associated with said load circuit for transforming direct current of constant value to alternating current of constant voltage comprising a network of reactances of opposite sign and electronic discharge means, and means associated with said first-mentioned network for controlling the effective value of the reactances having corresponding sign comprising a plurality of auxiliary circuits each associated with a different one of said reactances of corresponding sign to effect control of the quantity and direction of energy transfer between said supply circuit and said load circuit.

27. In combination, an electric circuit, a reactance element connected therein, a circuit in parallel relation with said reactance element comprising in series relation a reactance element and an electric valve, and means for controlling the conductivity of said electric valve in accordance with an electrical condition of said first-mentioned circuit.

28. In combination, an electric circuit, a reactance element connected therein, a circuit in parallel relation with said reactance element comprising in series relation a reactance of a sign opposite to that of said first-mentioned reactance element and an electric valve, and means for controlling the conductivity of said electric valve in accordance with an electrical condition of said first-mentioned reactance element.

29. In combination, an electric circuit, a reactance element connected therein, a circuit in parallel relation with said reactance element comprising in series relation a reactance element of the same sign as that of said first-mentioned reactance element and an electric valve, and means for controlling the conductivity of said electric valve in accordance with an electrical condition of said first-mentioned reactance element.

30. In combination, an electric circuit, an inductive device, a winding inductively related therewith, means for controlling the impedance of said inductive device comprising electric valve means and an auxiliary inductive reactance, and means for controlling the conductivity of said electric valve means in accordance with an electrical condition of said winding.

31. In combination, an electric circuit, an inductive device connected therein, a winding inductively related therewith, means for controlling the current through said winding to effect control of the resultant impedance of said inductive device comprising an electric valve means and an auxiliary control reactance, and means for controlling the conductivity of said electric valve means in accordance with an electrical condition of said winding.

32. In combination, an electrical network having a plurality of branches of reactances of opposite sign, a plurality of saturable inductive reactances each associated with a different branch of said network, and means for oppositely varying the inductive reactances of the saturable reactances associated with said reactances of opposite sign to maintain the resultant impedances of said branches substantially equal.

33. In combination, a source of constant voltage alternating current, a load circuit, translating apparatus interconnecting said circuits comprising a network of branches including reactances of opposite sign for transforming said constant voltage alternating current to alternating current of constant value, and a plurality of switching means each associated with a different one of said branches for effecting corresponding changes in the impedances of said branches to control the transfer of energy between said circuits.

34. In combination, a source of constant voltage alternating current, a load circuit, translating apparatus interconnecting said circuits comprising a network of branches including reactances of opposite sign for transforming said constant voltage alternating current to alternating current of constant value, and a plurality of switching means for effecting corresponding incremental changes in the impedances of said branches to maintain electrical symmetry of said network and to control the transfer of energy between said circuits.

CLODIUS H. WILLIS.
FRANK R. ELDER.
BURNICE D. BEDFORD.